(12) United States Patent
Chung et al.

(10) Patent No.: US 10,644,284 B2
(45) Date of Patent: May 5, 2020

(54) IN-SITU COIN CELL SUPPORT DEVICE FOR TRANSMISSION MODE X-RAY DIFFRACTION ANALYSIS CAPABLE OF CONTROLLING TEMPERATURE

(71) Applicant: KOREA INSTITUTE OF SCIENCE AND TECHNOLOGY, Seoul (KR)

(72) Inventors: Kyung Yoon Chung, Seoul (KR); Dong Hyun Kim, Seoul (KR); Liau Dieky Susanto, Seoul (KR); Jaeho Park, Seoul (KR); Jiwon Jeong, Seoul (KR); Hun-Gi Jung, Seoul (KR); Won Young Chang, Seoul (KR); Won Chang Choi, Seoul (KR); Byung Won Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 242 days.

(21) Appl. No.: 15/944,129

(22) Filed: Apr. 3, 2018

(65) Prior Publication Data

US 2019/0074498 A1   Mar. 7, 2019

(30) Foreign Application Priority Data

Sep. 7, 2017 (KR) .......................... 10-2017-0114482

(51) Int. Cl.
*H01M 2/10* (2006.01)
*H01M 10/48* (2006.01)
(Continued)

(52) U.S. Cl.
CPC ........ *H01M 2/1094* (2013.01); *G01N 23/207* (2013.01); *G01N 23/20033* (2013.01); *H01M 2/1038* (2013.01); *H01M 10/48* (2013.01)

(58) Field of Classification Search
CPC .. H01M 10/48; H01M 2/1038; H01M 2/1094; G01N 23/20033; G01N 23/207
See application file for complete search history.

(56) References Cited

U.S. PATENT DOCUMENTS

| 5,635,138 A * | 6/1997 | Amatucci ........ G01N 23/20008 324/432 |
| 2002/0192121 A1* | 12/2002 | Gural ..................... G01N 23/20 378/51 |

(Continued)

FOREIGN PATENT DOCUMENTS

| JP | 2005-221362 A | 8/2005 |
| KR | 10-2015-0047796 A | 5/2015 |

(Continued)

*Primary Examiner* — Carlos Barcena
(74) *Attorney, Agent, or Firm* — Rabin & Berdo, P.C.

(57) ABSTRACT

An in-situ coin cell support device for transmission mode X-ray diffraction analysis capable of controlling temperature. The device includes a coin cell seating unit including a seating part for receiving an in-situ coin cell, a positive electrode tab coupled to the seating part and connected to a positive electrode of the in-situ coin cell, and a negative electrode tab coupled to the seating part and connected to a negative electrode of the in-situ coin cell, a housing having a heat-insulating function, which surrounds the coin cell seating unit such that the positive and negative electrode tabs extend outwards from the housing and which includes one side wall and an opposite side wall arranged opposite each other with the in-situ coin cell interposed therebetween, and a temperature control unit coupled to the exterior of the housing and including an inlet port, an outlet port, and a flow passage.

12 Claims, 7 Drawing Sheets

(51) Int. Cl.
*G01N 23/20033* (2018.01)
*G01N 23/207* (2018.01)

(56) References Cited

U.S. PATENT DOCUMENTS

| | | | | |
|---|---|---|---|---|
| 2014/0093052 A1* | 4/2014 | Chupas | ............ | G01N 23/20025 378/208 |
| 2016/0036011 A1* | 2/2016 | Jung | .................... | H01M 10/48 429/174 |
| 2017/0047619 A1* | 2/2017 | Zhu | ...................... | H01M 10/48 |

FOREIGN PATENT DOCUMENTS

| KR | 10-1583373 B1 | 1/2016 |
|---|---|---|
| KR | 10-1750745 B1 | 6/2017 |

* cited by examiner

IN-SITU COIN CELL SUPPORT DEVICE FOR TRANSMISSION MODE X-RAY DIFFRACTION ANALYSIS CAPABLE OF CONTROLLING TEMPERATURE

CROSS-REFERENCE TO RELATED APPLICATIONS

This application claims priority under 35 U.S.C. § 119 to Korean Patent Application No. 10-2017-0114482 filed on Sep. 7, 2017 in the Korean Intellectual Property Office, the disclosure of which is incorporated herein by reference in its entirety.

BACKGROUND OF THE INVENTION

Field of the Invention

The present invention relates to an in-situ coin cell support device for transmission mode X-ray diffraction analysis capable of controlling temperature, and more particularly, to an in-situ coin cell support device for transmission mode X-ray diffraction analysis capable of controlling temperature, which is capable of measuring a structural change of an electrode material disposed inside an in-situ coin cell in real time, which occurs during a process of charging or discharging the in-situ coin cell.

Description of the Related Art

In recent years, with increased concerns about rising oil prices and environmental problems attributable to vehicle exhaust emissions and with increasingly stringent regulations on fuel efficiency, great efforts have been made to solve these problems all over the world. As part of these efforts, a secondary battery, which is one of energy storage devices, has attracted considerable attention, and development thereof is being actively conducted.

A secondary battery is chargeable or dischargeable, unlike a primary battery, and therefore, is applied to portable electronic devices, such as cellular phones, laptop computers, camcorders, etc., providing great living convenience. As various examples of secondary batteries, nickel-cadmium batteries, nickel-metal hydride batteries, nickel-hydrogen batteries, and lithium secondary batteries have been developed.

In particular, a lithium secondary battery has higher operating voltage and higher energy density per unit weight than a nickel-cadmium battery or a nickel-metal hydride battery, which is widely used as a power source for electronic devices. Therefore, the lithium secondary battery is attracting the greatest attention. The lithium secondary battery may be manufactured in various forms, such as a cylindrical type, a prismatic type, and a pouch type. Further, the lithium secondary battery may contribute to a reduction in thickness and weight of portable electronic devices due to its properties of excellent safety and lightweightness.

Recently, with increased demand for greenhouse gas reduction and regulations on exhaust emissions, the demand for environmentally friendly vehicles has increased. In order to meet this demand, the secondary battery industry, which to date has focused on small-sized electronic devices, is gradually expanding to the field of medium- or large-sized devices, such as electric vehicles, electricity storage systems, etc.

The lithium secondary battery comprises a positive electrode, which includes a positive electrode active material layer including lithium transition metal oxide, a negative electrode, which includes a negative electrode active material layer, a separator disposed between the positive electrode and the negative electrode in order to electrically insulate the positive electrode and the negative electrode from each other, and an organic electrolytic solution including a lithium salt and an organic solvent. An electrode active material layer is formed on an electrode current collector by directly applying an electrode active material slurry, which is prepared by dispersing electrode active material particles, a binder resin and other additives, such as a conductive material, in addition to the above-described components, if necessary, in a solvent, to the current collector and by drying the electrode active material slurry.

As the marketability of electric vehicles and energy storage systems (ESSs) is predicted to increase rapidly, there is demand for the development of a lithium secondary battery having excellent properties, such as high output and high capacity. In order to meet this demand, much industry-academic cooperation research on the whole development process from a material synthesis process to an analysis process is being actively conducted. In particular, the analysis process enables participants to obtain a deeper understanding of materials, and derivation of methods for improving material properties based thereon is very important to the development of new source materials.

Secondary battery analysis experts have used in-situ analysis methods, rather than ex-situ analysis methods, in order to measure data that are more relevant in practice to the process of operating a secondary battery. Various in-situ analysis methods, such as in-situ Raman, in-situ X-ray Absorption Spectroscopy (XAS), and in-situ X-ray Diffractometry (XRD), have been developed to date. Besides, the conversion of various other analysis methods, such as Scanning Electron Microscope (SEM) and Transmission Electron Microscope (TEM), to in-situ analysis methods is now actively underway.

Among the above analysis methods, the in-situ XRD analysis method is utilized as an essential analysis method in the secondary battery field. This is because the influence of a structural change made to a material on the performance of a secondary battery is very powerful. The in-situ XRD analysis method is of great significance in providing an index, based on which structural irreversibility of a material of a secondary battery is determined or a usable operating voltage range is set. To date, the applicability of various materials as a material of a secondary battery has been determined through the in-situ XRD analysis method. The in-situ XRD analysis method is utilized as a very important tool for a material of a commercial secondary battery in terms of industrial applicability, for example, derivation of methods for improving properties of a material of a secondary battery and setting of a limit range of operation through real-time observation of a structural change that occurs during a charging/discharging process.

Most studies on a lithium secondary battery using the in-situ XRD analysis method have been conducted at room temperature to date. However, the secondary battery may be exposed to a high temperature range or a low temperature range due to external factors during a charging/discharging process, leading to severe deterioration of the performance of the secondary battery or explosion of the battery.

The present invention provides a device that enables a user to observe a structural change of a secondary battery, which occurs during a charging/discharging process in a wide temperature range from a low temperature to a high temperature, to thereby facilitate understanding of mechanisms of reaction and deterioration of secondary battery cells, which are placed in various temperature ranges, together with an existing established analysis system for performing analysis in a room temperature range, and consequently contribute to the development of a secondary battery having improved stability and performance.

RELATED ART DOCUMENT

Patent Document (Patent Document 1) Korean Registered Patent No. 10-1583373 (Jan. 7, 2016)

SUMMARY OF THE INVENTION

Therefore, the present invention has been made in view of the above problems, and it is an object of the present invention to provide an in-situ coin cell support device for transmission mode X-ray diffraction analysis capable of controlling temperature, which is capable of realizing a wide temperature range from a low temperature to a high temperature while an in-situ coin cell is charged or discharged, to thereby measure a structural change and a reaction mechanism of the in-situ coin cell in real time, which occur while the in-situ coin cell is charged or discharged within a wide temperature range from a low temperature to a high temperature.

In accordance with the present invention, the above and other objects can be accomplished by the provision of an in-situ coin cell support device for transmission mode X-ray diffraction analysis capable of controlling temperature, including a coin cell seating unit including a seating part for receiving an in-situ coin cell having an X-ray transmission window, the seating part having a first through-hole formed therein to allow X-rays to pass therethrough, a positive electrode tab coupled to one side of the seating part and connected to a positive electrode of the in-situ coin cell, and a negative electrode tab coupled to an opposite side of the seating part and connected to a negative electrode of the in-situ coin cell, a housing having a heat-insulating function, the housing being disposed to surround the coin cell seating unit such that the positive electrode tab and the negative electrode tab extend outwards from the housing and including one side wall having a second through-hole formed therein to allow X-rays to pass therethrough and an opposite side wall having a third through-hole formed therein to allow X-rays to pass therethrough, the one side wall and the opposite side wall being arranged opposite each other with the in-situ coin cell interposed therebetween, and a temperature control unit closely coupled to an exterior of the housing, the temperature control unit including an inlet port, an outlet port, and a flow passage.

The housing may include a first panel having therein the second through-hole and supporting the seating part mounted thereto, and a second panel having therein the third through-hole, and the first panel and the second panel may be removably coupled to each other and may form an accommodation space for accommodating the seating part therebetween.

The first panel may be formed in an L shape and may have one end portion formed to be stepped and an opposite end portion formed to be stepped, and the second panel may be formed in a U shape and may have one end portion and an opposite end portion that are coupled and locked respectively to the one end portion and the opposite end portion of the first panel that are formed to be stepped.

The temperature control unit may include a control block coupled to the first panel, the inlet port and the outlet port may be formed in one side of the control block, and the flow passage may be formed in a zigzag shape in the control block so as to communicate with the inlet port and the outlet port.

The control block may have a groove continuously formed in a zigzag shape in a surface thereof that is coupled to the first panel, and the flow passage may be formed by bringing the groove into close contact with the first panel.

The control block may be coupled to the first panel such that the control block and the one end portion of the first panel that is formed to be stepped form a locking recess therebetween, and the one end portion of the second panel may be inserted into and locked into the locking recess.

The seating part may include a pair of holding blocks disposed on the first panel so as to be brought into close contact with two opposite sides of the in-situ coin cell and to hold the in-situ coin cell, each of the pair of holding blocks having a seating recess formed to be stepped so as to support the in-situ coin cell seated therein and being coupled with a respective one of the positive electrode tab and the negative electrode tab, and a spring member inserted into at least one insertion hole formed in each of surfaces of the pair of holding blocks that face each other so as to move the pair of holding blocks toward each other.

The seating part may further include a base plate secured to the first panel to support the pair of holding blocks disposed thereon, and a guide part including a plurality of guide rails secured to a top surface of the base plate to guide movement of the pair of holding blocks movably coupled thereon so that the pair of holding blocks move toward or away from each other.

The seating part may further include an insulation member disposed between the first panel and the base plate.

The seating part may include a pair of pivotal blocks disposed on the first panel such that the pair of pivotal blocks pivot toward each other about one end of each thereof so as to be brought into close contact with two opposite sides of the in-situ coin cell and to hold the in-situ coin cell, each of the pair of pivotal blocks having a seating recess formed to be stepped so as to support the in-situ coin cell seated therein and being coupled with a respective one of the positive electrode tab and the negative electrode tab, and a spring member inserted into at least one insertion hole formed in the one end of each of the pair of pivotal blocks that faces a remaining one of the pair of pivotal blocks so as to apply pushing force so that the pair of pivotal blocks pivot toward each other.

The seating part may further include a pair of finger members for holding the in-situ coin cell, and each of the pair of finger members may be provided at one side of a respective one of the pair of pivotal blocks that faces a remaining one of the pair of pivotal blocks.

The seating part may further include a base plate secured to the first panel to support the pair of pivotal blocks disposed thereon, and an insulation member disposed between the first panel and the base plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
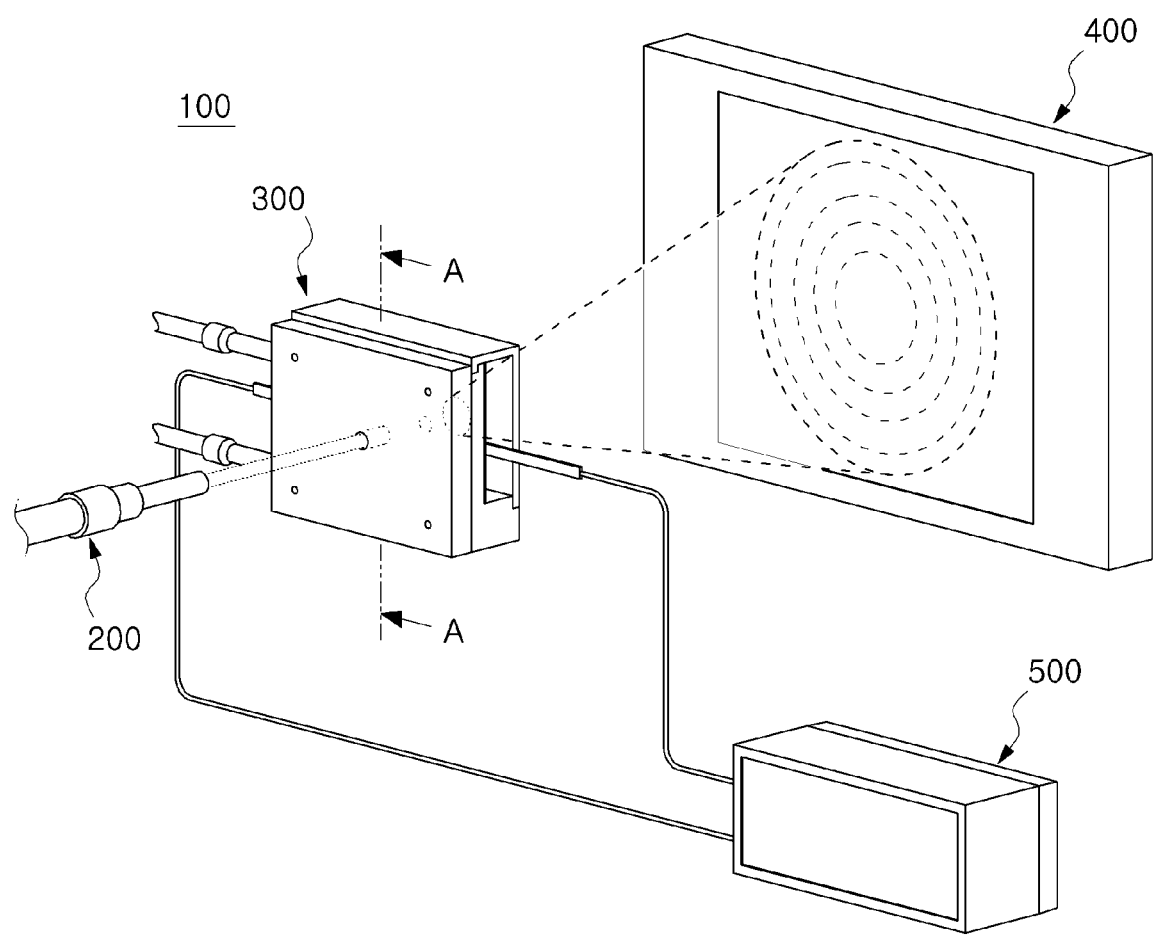
FIG. 1 is a view schematically illustrating the structure of a transmission mode X-ray diffraction analysis system according to the present invention.

In order to sufficiently understand the present invention and advantages related to the operation of the present invention as well as the objects realized by the implementation of the present invention, it is required to reference the accompanying drawings, which illustrate exemplary embodiments of the present invention and content described in connection with the accompanying drawings.

Hereinafter, the present invention will be described in detail through the description of exemplary embodiments of the present invention with reference to the accompanying drawings. The same reference numerals provided in the respective drawings indicate the same elements.

Figure 2:
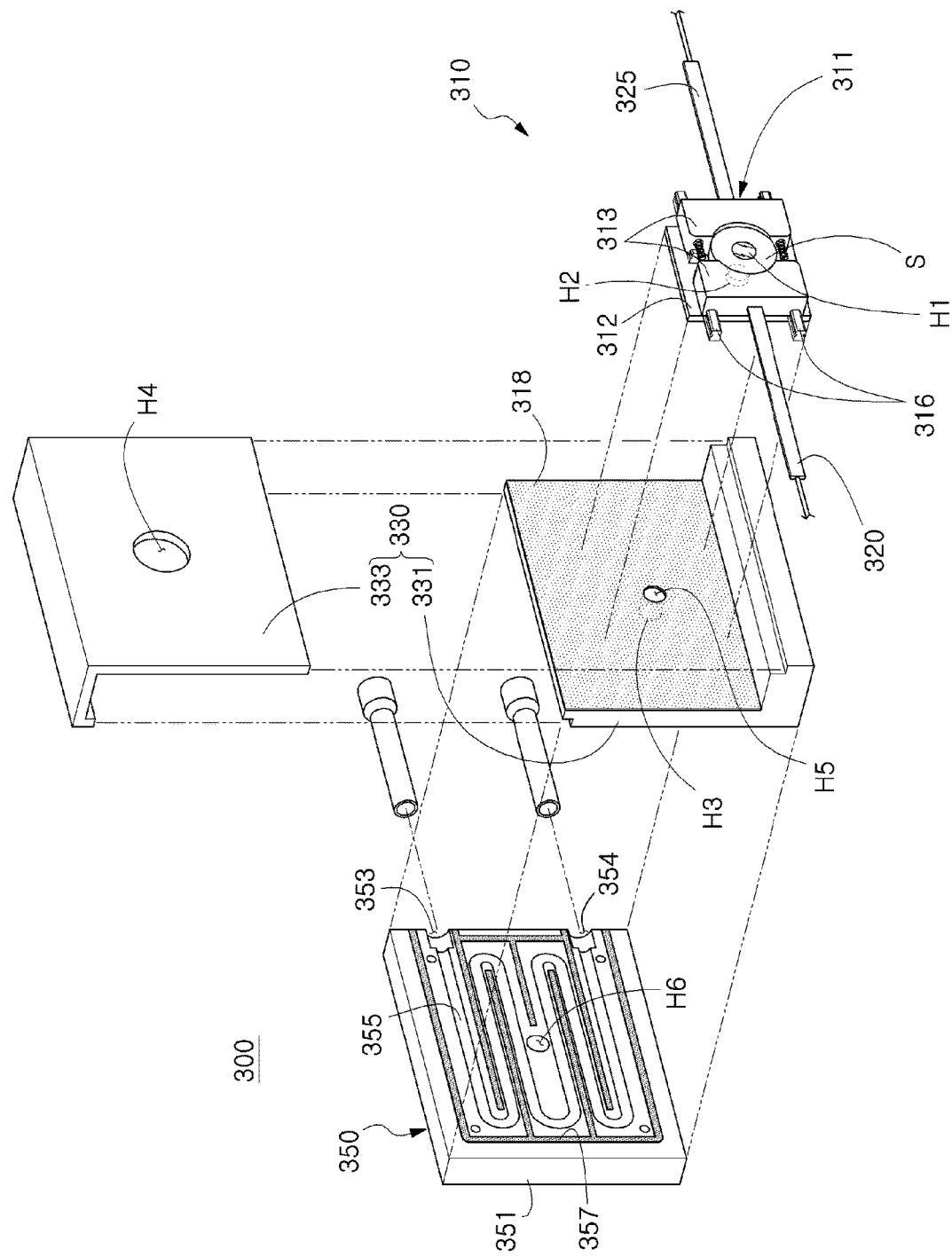
FIG. 2 is an exploded perspective view illustrating an in-situ coin cell support device according to the present invention.
Figure 3:
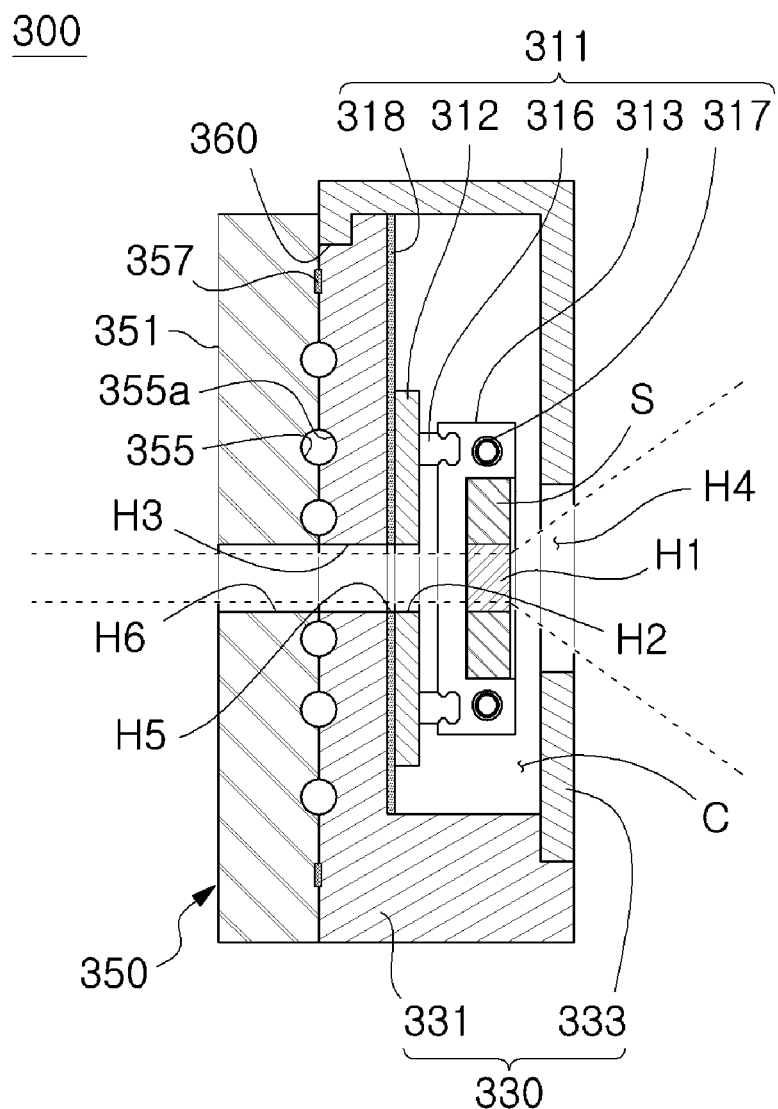
FIG. 3 is a sectional view of the in-situ coin cell support device according to the present invention, taken along line A-A in FIG. 1.
Figure 4:
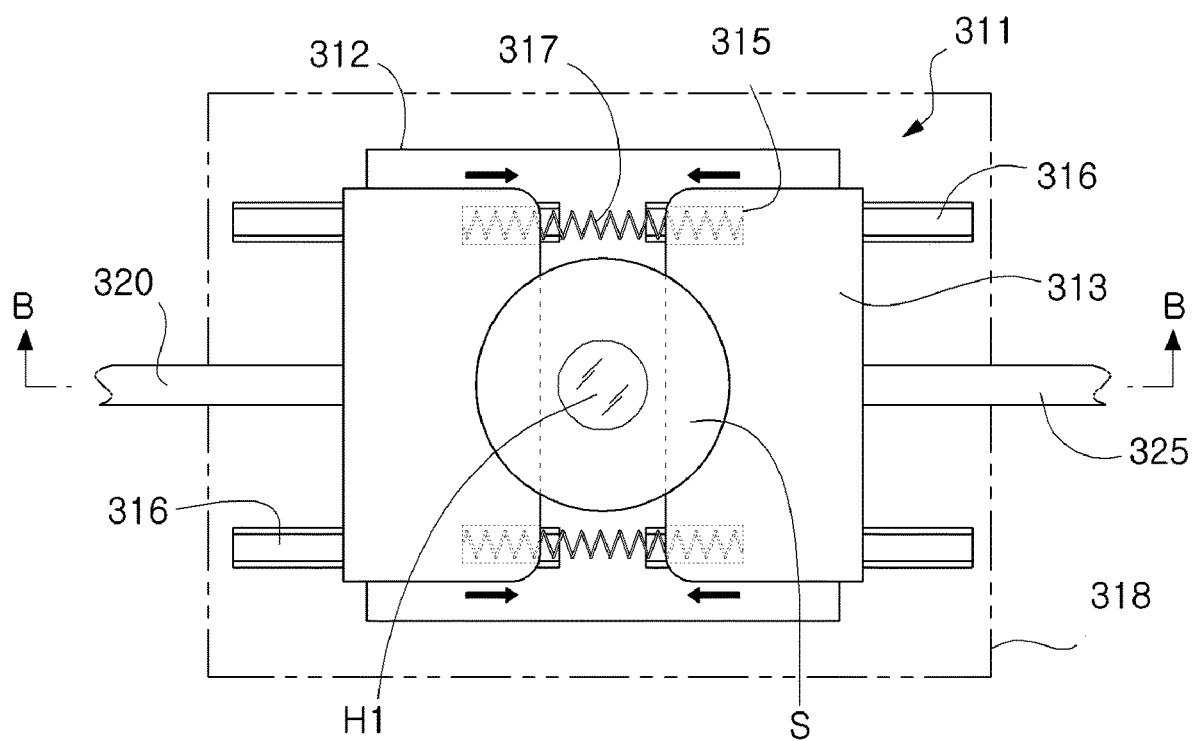
FIG. 4 is a plan view illustrating a seating part according to one embodiment of the present invention.
Figure 5:
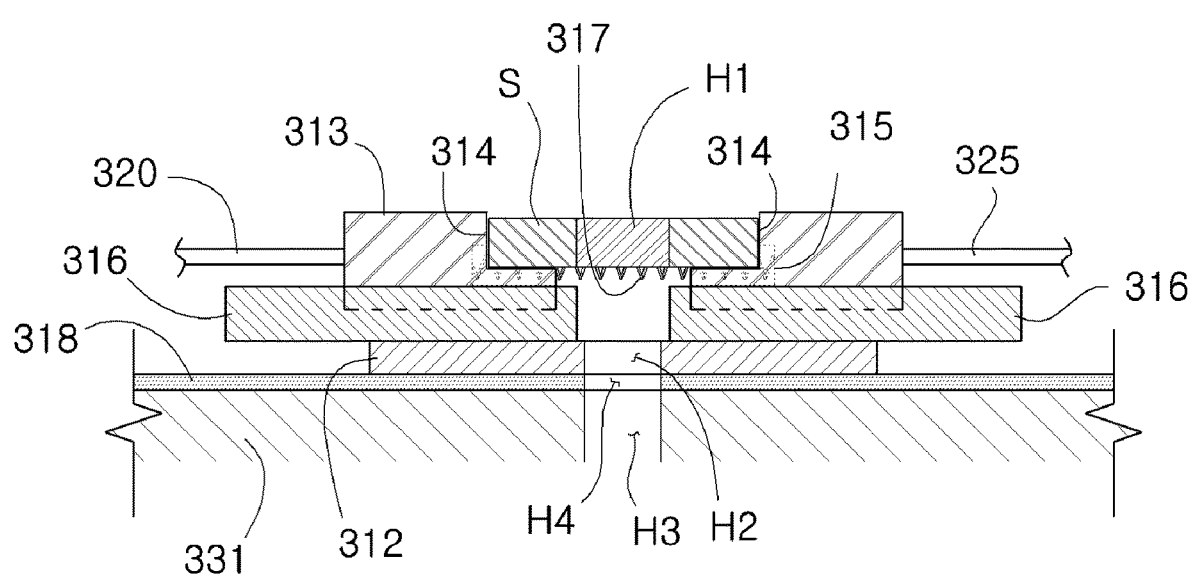
FIG. 5 is a sectional view taken along line B-B in FIG. 4.
Figure 6:
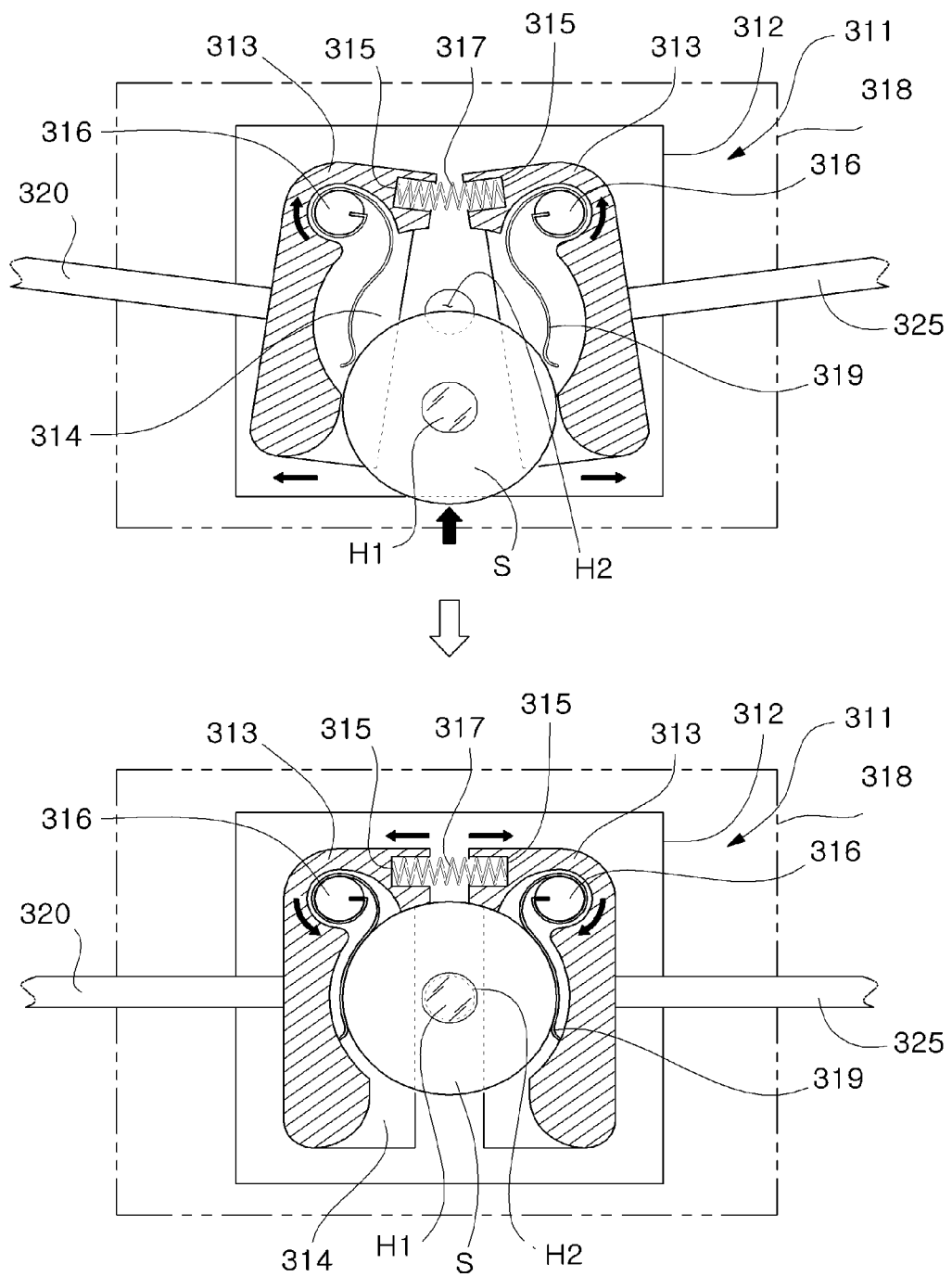
FIG. 6 is a plan view illustrating a seating part according to another embodiment of the present invention.
Figure 7:
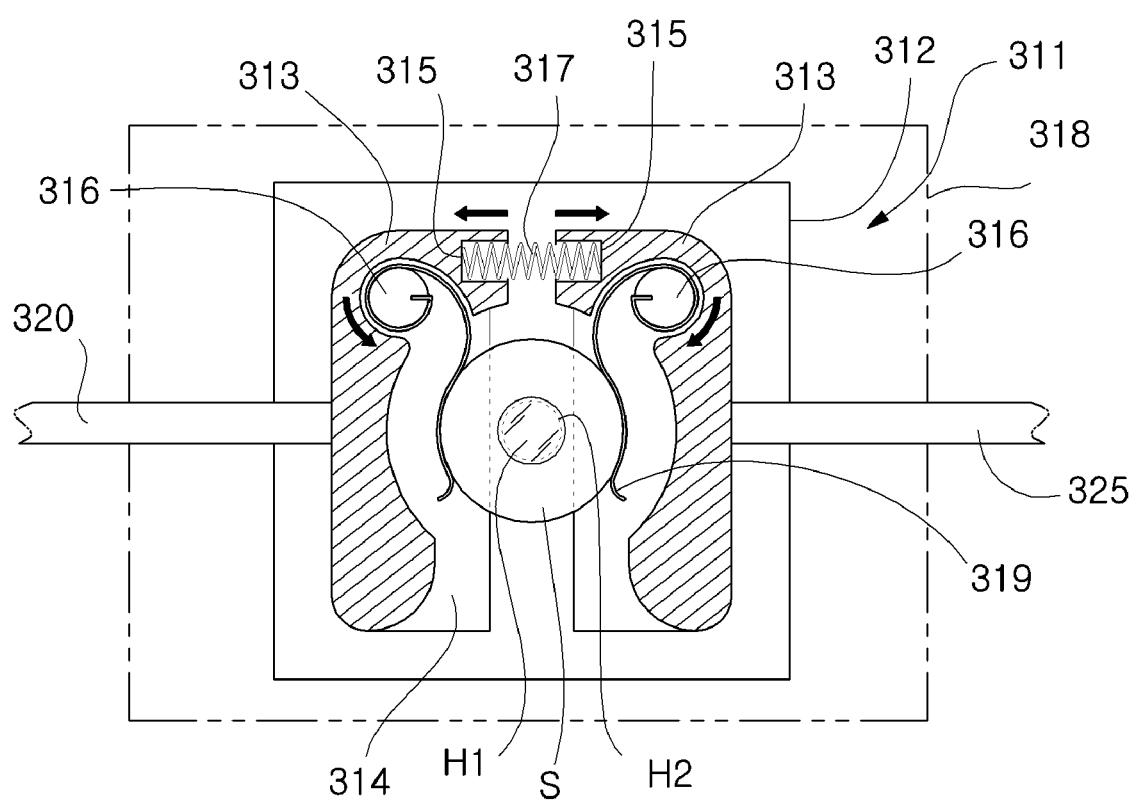
FIG. 7 is a plan view illustrating the state in which a small-sized in-situ coin cell is seated in the seating part according to the other embodiment of the present invention.

FIG. 1 is a view schematically illustrating the structure of a transmission mode X-ray diffraction analysis system according to the present invention. FIG. 2 is an exploded perspective view illustrating an in-situ coin cell support device according to the present invention. FIG. 3 is a sectional view of the in-situ coin cell support device according to the present invention, taken along line A-A in FIG. 1. FIG. 4 is a plan view illustrating a seating part according to one embodiment of the present invention. FIG. 5 is a sectional view taken along line B-B in FIG. 4. FIG. 6 is a plan view illustrating a seating part according to another embodiment of the present invention. FIG. 7 is a plan view illustrating the state in which a small-sized in-situ coin cell is seated in the seating part according to the other embodiment of the present invention.

Referring to FIG. 1, a transmission mode X-ray diffraction analysis system 100 according to the present invention comprises an X-ray generator 200 for generating X-rays, an in-situ coin cell support device 300, which is disposed to face the X-ray generator 200 and is configured to support an in-situ coin cell S and to maintain a constant temperature environment while the in-situ coin cell S is charged or discharged, an X-ray detection device 400, which is disposed opposite the X-ray generator 200, with the in-situ coin cell support device 300 interposed therebetween, and is configured to detect diffracted X-rays, and a charging/discharging device 500, which is connected to the in-situ coin cell S to charge or discharge the in-situ coin cell S.

The transmission mode X-ray diffraction analysis system 100 according to the present invention enables a user to observe a structural change and a reaction mechanism of the in-situ coin cell S while the in-situ coin cell S is charged or discharged by radiating X-rays to the in-situ coin cell S accommodated in the in-situ coin cell support device 300, in which a constant temperature environment is maintained.

In addition, the transmission mode X-ray diffraction analysis system 100 according to the present invention may measure a structural change of the in-situ coin cell S in real time while the in-situ coin cell S is charged or discharged under a specific temperature environment condition.

The X-ray generator 200 according to the embodiment focuses X-rays to be radiated to the in-situ coin cell S, and radiates X-rays to the in-situ coin cell S in the form of linear parallel light.

The X-rays radiated to the in-situ coin cell S are diffracted in a specific direction, and accordingly, diffraction peaks are formed. Because each material has its distinctive lattice constant and atomic stacking structure, characteristic X-ray diffraction peaks are formed at specific positions in each material, based on which it is possible to analyze the phase of the material.

In this embodiment, the X-rays radiated to the in-situ coin cell S penetrate the in-situ coin cell S and are diffracted, and subsequently are detected by the X-ray detection device 400, which is disposed opposite the X-ray generator 200. The charging/discharging device 500 according to the embodiment is electrically connected to the positive electrode and the negative electrode of the in-situ coin cell S via a positive electrode tab 320 and a negative electrode tab 325, which are described later, and serves to charge or discharge the in-situ coin cell S.

In addition, the in-situ coin cell support device 300 according to the embodiment serves to support the in-situ coin cell S and to create an environment in which the in-situ coin cell S may be charged or discharged at a specific temperature within a room temperature range, for example, from about 10 to 30° C., a low temperature range, for example, from about −25 to 10° C., and a high temperature range, for example, from about 30 to 100° C.

Referring to FIGS. 2 and 3, the in-situ coin cell support device 300 comprises a housing 330, which has a heat-insulating function, a coin cell seating unit 310, which is disposed in an accommodation space C in the housing 330 and in which the in-situ coin cell S is seated, and a temperature control unit 350, which is closely coupled to the exterior of the housing 330 and maintains the internal temperature of the housing 330 at a specific temperature.

The housing 330 is disposed to surround the coin cell seating unit 310 and provides a space in which the in-situ coin cell S is accommodated. In addition, the housing 330 serves to maintain a thermal equilibrium state while the in-situ coin cell S is charged or discharged, so that the in-situ coin cell S is charged or discharged at a specific temperature.

The housing 330 comprises a first panel 331, to which the coin cell seating unit 310 is mounted, and a second panel 333, which is removably coupled to the first panel 331. The first panel 331 and the second panel 333 form therebetween the accommodation space C, in which the coin cell seating unit 310 is accommodated.

In this embodiment, the first panel 331 and the second panel 333 may be made of an aluminum material, which has high thermal conductivity and corrosion resistance and does not react to radioactive rays such as X-rays; however, the embodiment is not limited thereto. Any material may be used for the first and second panels, as long as it has high thermal conductivity and corrosion resistance and does not react to X-rays.

In order to improve the assembly efficiency of the first panel 331 and the second panel 333, the first panel 331 is formed in an 'L' shape, and each of one end portion and the opposite end portion thereof is formed in a stepped shape, and the second panel 333 is formed in a 'U' shape such that one end portion and the opposite end portion thereof are coupled and locked to the one end portion and the opposite end portion of the first panel 331, respectively.

As shown in FIG. 3, the one end portion of the L-shaped first panel 331, which is located at the upper portion of the first panel 331, is stepped from the outer wall surface toward the inner wall surface, and accordingly, the one end portion of the U-shaped second panel 333, which is located at the upper portion of the second panel 333 and is formed to be bent, is coupled and locked to the stepped one end portion of the first panel 331.

The opposite end portion of the L-shaped first panel 331, which is located at the lower portion of the first panel 331, is stepped downwards, and accordingly, the opposite end portion of the U-shaped second panel 333, which is located at the lower portion of the second panel 333, is coupled and locked to the stepped opposite end portion of the first panel 331. As such, the first panel 331 and the second panel 333 are coupled to each other in a shape-matching manner.

The in-situ coin cell S, which is subject to X-ray diffraction analysis, is provided at the center thereof with an X-ray transmission window H1 that X-rays penetrate. The coin cell seating unit 310 comprises a seating part 311, which will be described later, and the seating part 311 has therein a first through-hole H2, which is disposed in line with the X-ray transmission window H1 and through which X-rays pass.

The first panel 331 has therein a second through-hole H3, which is formed in the center thereof and through which X-rays pass, and the second panel 333 has therein a third through-hole H4, which is formed in the center thereof and through which X-rays pass. That is, the X-ray transmission window H1 and the first to third through-holes H2, H3 and H4 are arranged in line with each other.

The coin cell seating unit 310 is disposed in the accommodation space C in the housing 330, which is formed by coupling of the first panel 331 and the second panel 333, and serves to provide a space in which the in-situ coin cell S is seated.

The coin cell seating unit 310 comprises the seating part 311, in which the in-situ coin cell S is seated, the positive electrode tab 320, which is coupled to one side of the seating part 311 and is connected to the positive electrode of the in-situ coin cell S, and the negative electrode tab 325, which is coupled to the opposite side of the seating part 311 and is connected to the negative electrode of the in-situ coin cell S.

The in-situ coin cell S, which is subject to X-ray diffraction analysis and is provided with the X-ray transmission window H1, is seated in the seating part 311, and the seating part 311 has the first through-hole H2 formed in the center thereof, which is disposed in line with the X-ray transmission window H1 and through which X-rays pass.

Referring to FIGS. 4 and 5, the seating part 311 according to one embodiment of the present invention comprises an insulation member 318 secured to the first panel 331, a base plate 312 secured to the insulation member 318, a pair of holding blocks 313, which are movably provided on the base plate 312 to hold the in-situ coin cell S and each of which is coupled with a respective one of the positive electrode tab 320 and the negative electrode tab 325, a guide part 316, which is disposed between the base plate 312 and the pair of holding blocks 313 to guide movement of the pair of holding blocks 313 so that the pair of holding blocks 313 move toward or away from each other, and a spring member 317, each end of which is coupled to a respective one of the pair of holding blocks 313 to pull the pair of holding blocks 313 toward each other.

The insulation member 318 is attached and secured to one surface of the first panel 331, which forms an inner wall surface of the housing 330, and the base plate 312 is securely mounted to the insulation member 318.

The base plate 312 has therein the first through-hole H2, through which X-rays pass, and the insulation member 318 has therein a fourth through-hole H5, through which X-rays pass. The first through-hole H2 and the fourth through-hole H5 are arranged in line with each other.

The guide part 316 is disposed between the base plate 312 and the pair of holding blocks 313 to guide the movement of the pair of holding blocks 313 so that the pair of holding blocks 313 move toward or away from each other.

The guide part 316 comprises a plurality of guide rails 316, which are securely mounted to the top surface of the base plate 312 and are arranged parallel to each other. The pair of holding blocks 313 are movably coupled to the top surfaces of the guide rails 316. That is, the pair of holding blocks 313 move toward or away from each other along the guide rails 316.

Each of the pair of holding blocks 313 has a seating recess 314 formed in one side thereof that faces the other one of the holding blocks 313. Each of the seating recesses 314 has a concavely stepped shape to receive the in-situ coin cell S. The in-situ coin cell S is seated in the seating recesses 314 in the holding blocks 313, and the pair of holding blocks 313 move toward each other and come into close contact with two opposite sides of the in-situ coin cell S, thereby holding the in-situ coin cell S.

Each of the pair of holding blocks 313 is coupled with a respective one of the positive electrode tab 320 and the negative electrode tab 325. The positive electrode tab 320 and the negative electrode tab 325 are connected to the positive electrode and the negative electrode of the in-situ coin cell S, respectively, and extend in outward directions of the housing 330. The positive electrode tab 320 and the negative electrode tab 325 penetrate the housing 330, extend outwards from two opposite sides of the housing 330, and are connected to the charging/discharging device 500.

X-rays pass through the first through-hole H2 formed in the base plate 312, and subsequently, are radiated to the X-ray transmission window H1 in the in-situ coin cell S. At this time, the surfaces of the pair of holding blocks 313 that face each other may be in close contact with each other. In this case, additional X-ray transmission holes (not shown) may be formed in the surfaces of the pair of holding blocks 313 that face each other.

In order to enable the pair of holding blocks 313 to actively move toward or away from each other corresponding to the size of the in-situ coin cell S so as to hold the in-situ coin cell S, at least one insertion hole 315 is formed in each of the surfaces of the pair of holding blocks 313 that face each other. Two opposite ends of the spring member 317 are inserted into and secured to the insertion holes 315 formed in the holding blocks 313.

If a user separates the pair of holding blocks 313 from each other and places the in-situ coin cell S in the seating recesses 314 in the pair of holding blocks 313, the pair of holding blocks 313 move toward each other along the guide rails 315 due to the restoring force of the spring member 317, and accordingly, the pair of holding blocks 313 are brought into close contact with the in-situ coin cell S and hold the in-situ coin cell S.

As described above, as the pair of holding blocks 313 move toward or away from each other corresponding to the size of the in-situ coin cell S due to the spring member 317, the seating part 311 according to the embodiment of the present invention is capable of stably holding the in-situ coin cell S.

Referring to FIG. 6, a seating part 311 according to another embodiment of the present invention comprises an insulation member 318 secured to the first panel 331, a base plate 312 secured to the insulation member 318, a pair of pivotal blocks 313, which are pivotably provided on the base plate 312 to hold the in-situ coin cell S through pivotal movement about one end of each thereof and each of which is coupled with a respective one of the positive electrode tab 320 and the negative electrode tab 325, and a spring member 317, each end of which is coupled to the one end of a respective one of the pair of pivotal blocks 313 to apply pushing force so that the pair of pivotal blocks 313 pivot toward each other.

The insulation member 318 is attached and secured to one surface of the first panel 331 that forms an inner wall surface of the housing 330, and has therein a fourth through-hole H5, through which X-rays pass. The base plate 312 is securely mounted to the top surface of the insulation member 318, and has therein the first through-hole H2, through which X-rays pass. The first through-hole H2 and the fourth through-hole H5 are arranged in line with each other.

Each of the pivot shafts 316 penetrates the one end of a respective one of the pair of pivotal blocks 313 and is coupled to the first panel 331 and the base plate 312. The pair of pivotal blocks 313 pivot toward each other about the respective pivot shafts 316 and come into close contact with two opposite sides of the in-situ coin cell S, thereby holding the in-situ coin cell S.

Each of the pair of pivotal blocks 313 has a seating recess 314 formed in one side thereof that faces the other one of the pivotal blocks 313. Each of the seating recesses 314 has a concavely stepped shape to receive the in-situ coin cell S. The in-situ coin cell S is seated in the seating recesses 314 in the pivotal blocks 313, and the pair of pivotal blocks 313 pivot toward each other and come into close contact with two opposite sides of the in-situ coin cell S, thereby holding the in-situ coin cell S. The opposite end of each of the pivotal blocks 313, via which the in-situ coin cell S is slidingly inserted between the pivotal blocks 313, is formed to be rounded.

As shown in FIG. 7, the seating part 311 according to the other embodiment of the present invention further comprises a pair of finger members 319 for holding the in-situ coin cell S, each of which is provided at the one side of a respective one of the pivotal blocks 313 that faces the other one of the pivotal blocks 313. One end of each of the finger members 319 is wound around a corresponding one of the pivot shafts 316, and the opposite end thereof is brought into close contact with the side of the in-situ coin cell S. The finger members 319 are made of a flexible and elastic material so as to be deformed corresponding to the shape of the in-situ coin cell S when the in-situ coin cell S is slidingly inserted between the finger members 319.

When the in-situ coin cell S that is to be seated in the seating recesses 314 formed in the pivotal blocks 313 is smaller than the seating recesses 314, the above-described pair of finger members 319 are capable of tightly holding two opposite sides of this small-sized in-situ coin cell S.

Each of the pair of pivotal blocks 313 is coupled with a respective one of the positive electrode tab 320 and the negative electrode tab 325. The positive electrode tab 320 and the negative electrode tab 325 are connected to the positive electrode and the negative electrode of the in-situ coin cell S, respectively, and extend in the outward direction of the housing 330. The positive electrode tab 320 and the negative electrode tab 325 penetrate the housing 330 and extend outwards from two opposite sides of the housing 330.

X-rays pass through the first through-hole H2 formed in the base plate 312, and subsequently, are radiated to the X-ray transmission window H1 of the in-situ coin cell S. At this time, the surfaces of the pair of pivotal blocks 313 that face each other may be in close contact with each other. In this case, additional X-ray transmission holes (not shown) may be formed in the surfaces of the pair of pivotal blocks 313 that face each other.

In order to enable the pair of pivotal blocks 313 to actively pivot toward or away from each other corresponding to the size of the in-situ coin cell S so as to hold the in-situ coin cell S, at least one insertion hole 315 is formed in each of the one ends of the pair of pivotal blocks 313 that face each other. Two opposite ends of the spring member 317 are inserted into and secured to the insertion holes 315. The pair of pivotal blocks 313 are pivoted toward each other by the pushing force of the spring member 317.

If a user separates the pair of pivotal blocks 313 from each other, and subsequently, places the in-situ coin cell S in the seating recesses 314 in the pair of pivotal blocks 313 or slidingly inserts the in-situ coin cell S between the pair of finger members 319, the pair of pivotal blocks 313 are pivoted toward each other about the pivot shafts 316 by the pushing force of the spring member 317, and accordingly, the pair of pivotal blocks 313 or the pair of finger members 319 are brought into close contact with the in-situ coin cell S and hold the in-situ coin cell S.

As described above, as the pair of pivotal blocks 313 pivot toward or away from each other corresponding to the size of the in-situ coin cell S due to the spring member 317, the seating part 311 according to the other embodiment of the present invention is capable of stably holding the in-situ coin cell S.

The temperature control unit 350 is coupled to the exterior of the housing 330 and serves to maintain the internal temperature of the housing 330 at a specific temperature. In particular, since the transmission mode X-ray diffraction analysis system 100 according to the present invention measures a structural change and a reaction mechanism of the in-situ coin cell S in real time while the in-situ coin cell S is charged or discharged within a wide temperature range from a low temperature to a high temperature, the temperature control unit 350 serves to control the internal temperature of the housing 330.

Referring to FIG. 2, the temperature control unit 350 comprises a control block 351, which is coupled to the opposite surface of the first panel 331 that forms an outer wall surface of the housing 330. The control block 351 comprises an inlet port 353 formed in one side thereof, through which refrigerant or a heat medium is introduced thereinto, an outlet port 354 formed in one side thereof, through which the refrigerant or the heat medium is discharged therefrom, and a flow passage 355, which is formed in a zigzag shape therein.

In this embodiment, the control block 351 may be made of an aluminum material, which has high thermal conductivity and corrosion resistance and does not react to radioactive rays such as X-rays; however, the embodiment is not limited thereto. Any material may be used for the control block, as long as it has high thermal conductivity and corrosion resistance and does not react to X-rays.

The control block 351 has a groove 355, which is continuously formed in a zigzag shape in the surface thereof that is coupled to the first panel 331. The flow passage 355 is formed by bringing the groove 355 in the control block 351 into close contact with the opposite surface of the first panel 331. The first panel 331 may have a groove 355a, which is formed in the surface thereof that is coupled to the control block 351 so as to correspond to the groove 355 formed in the control block 351 and to come into close contact with the groove 355. That is, the flow passage 355 may be formed by close contact between the groove 355 formed in the control block 351 and the groove 355a formed in the first panel 331.

The inlet port 353, the flow passage 355 and the outlet port 354 communicate with each other, so that the refrigerant or the heat medium introduced into the inlet port 353 moves along the flow passage 355 and is discharged from the outlet port 354.

In this embodiment, the internal temperature conditions of the housing 330 may variously be controlled depending on the refrigerant or the heat medium introduced into the control block 351.

The control block 351 may have therein a fifth through-hole H6, through which X-rays pass and which is disposed in line with the second through-hole H3.

The control block 351 may be provided with a sealing member 357, which is disposed on the surface thereof that is coupled to the first panel 331. The sealing member 357 and the zigzag-shaped groove 355 may be arranged alternately. The sealing member 357 may be made of various materials such as a rubber material, Teflon, etc.

As described above, since the one end portion of the first panel 331 is formed in a stepped shape, when the control block 351 is coupled to the opposite surface of the first panel 331 that forms an outer wall surface of the housing 330, a concave locking recess 360 is formed between the control block 351 and the first panel 331. Therefore, the one end portion of the second panel 333 is inserted into and locked into the locking recess 360 formed by coupling of the control block 351 and the first panel 331. As a result, the coupling of the first panel 331 and the second panel 333 is further facilitated.

The operation of the transmission mode X-ray diffraction analysis system 100 according to the present invention configured as described above will be described below.

As shown in FIGS. 1 and 2, the coin cell seating unit 310 is coupled to the one surface of the first panel 331, the in-situ coin cell S is seated in the coin cell seating unit 310, and the second panel 333 is lockingly coupled to the first panel 331, thereby completely assembling the housing 330 having a heat-insulating function.

The temperature control unit 350 is closely coupled to the opposite surface of the first panel 331, and refrigerant or a heat medium is introduced into the inlet port 353 so that the internal temperature of the housing 330 is maintained at a specific temperature.

Subsequently, while the in-situ coin cell S is charged or discharged by the charging/discharging device 500 connected to the positive electrode tab 320 and the negative electrode tab 325, the X-rays generated by the X-ray generator 200 sequentially penetrate the temperature control unit 350, the first panel 331 of the housing 330 and the coin cell seating unit 310, and are radiated to the in-situ coin cell S. The X-rays radiated to the in-situ coin cell S are diffracted, penetrate the second panel 333 of the housing 330, and are radiated to the X-ray detection device 400.

As is apparent from the above description, in the embodiment of the present invention, while the in-situ coin cell is charged or discharged, an environment having a wide temperature range from a low temperature to a high temperature is created by the temperature control unit, which is closely coupled to the exterior of the housing in which the in-situ coin cell is accommodated, thereby enabling a user to observe a structural change and a reaction mechanism of the in-situ coin cell that is charged or discharged in a low temperature or high temperature range.

In addition, the embodiment of the present invention enables a user to observe a structural change and a reaction mechanism of the in-situ coin cell in accordance with the temperature by changing the temperature condition under which the in-situ coin cell is charged or discharged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An in-situ coin cell support device for transmission mode X-ray diffraction analysis capable of controlling temperature, comprising:
   a coin cell seating unit comprising a seating part for receiving an in-situ coin cell having an X-ray transmission window, the seating part having a first through-hole formed therein to allow X-rays to pass therethrough, a positive electrode tab coupled to one side of the seating part and connected to a positive electrode of the in-situ coin cell, and a negative electrode tab coupled to an opposite side of the seating part and connected to a negative electrode of the in-situ coin cell;
   a housing having a heat-insulating function, the housing being disposed to surround the coin cell seating unit such that the positive electrode tab and the negative electrode tab extend outwards from the housing and comprising one side wall having a second through-hole formed therein to allow X-rays to pass therethrough and an opposite side wall having a third through-hole formed therein to allow X-rays to pass therethrough, the one side wall and the opposite side wall being arranged opposite each other with the in-situ coin cell interposed therebetween; and
   a temperature control unit closely coupled to an exterior of the housing, the temperature control unit comprising an inlet port, an outlet port, and a flow passage.

2. The in-situ coin cell support device according to claim 1, wherein the housing comprises:
   a first panel having therein the second through-hole and supporting the seating part mounted thereto; and
   a second panel having therein the third through-hole, and
   wherein the first panel and the second panel are removably coupled to each other and form an accommodation space for accommodating the seating part therebetween.

3. The in-situ coin cell support device according to claim 2, wherein the first panel is formed in an L shape and has one end portion formed to be stepped and an opposite end portion formed to be stepped, and
   the second panel is formed in a U shape and has one end portion and an opposite end portion that are coupled and locked respectively to the one end portion and the opposite end portion of the first panel that are formed to be stepped.

4. The in-situ coin cell support device according to claim 3, wherein the temperature control unit comprises a control block coupled to the first panel, and wherein the inlet port and the outlet port are formed in one side of the control block, and the flow passage is formed in a zigzag shape in the control block so as to communicate with the inlet port and the outlet port.

5. The in-situ coin cell support device according to claim 4, wherein the control block has a groove continuously formed in a zigzag shape in a surface thereof that is coupled to the first panel, and wherein the flow passage is formed by bringing the groove into close contact with the first panel.

6. The in-situ coin cell support device according to claim 4, wherein the control block is coupled to the first panel such that the control block and the one end portion of the first panel that is formed to be stepped form a locking recess therebetween, and wherein the one end portion of the second panel is inserted into and locked into the locking recess.

7. The in-situ coin cell support device according to claim 2, wherein the seating part comprises:

a pair of holding blocks disposed on the first panel so as to be brought into close contact with two opposite sides of the in-situ coin cell and to hold the in-situ coin cell, each of the pair of holding blocks having a seating recess formed to be stepped so as to support the in-situ coin cell seated therein and being coupled with a respective one of the positive electrode tab and the negative electrode tab; and a spring member inserted into at least one insertion hole formed in each of surfaces of the pair of holding blocks that face each other so as to move the pair of holding blocks toward each other.

8. The in-situ coin cell support device according to claim 7, wherein the seating part further comprises:

a base plate secured to the first panel to support the pair of holding blocks disposed thereon; and a guide part comprising a plurality of guide rails secured to a top surface of the base plate to guide movement of the pair of holding blocks movably coupled thereon so that the pair of holding blocks move toward or away from each other.

9. The in-situ coin cell support device according to claim 8, wherein the seating part further comprises an insulation member disposed between the first panel and the base plate.

10. The in-situ coin cell support device according to claim 2, wherein the seating part comprises:

a pair of pivotal blocks disposed on the first panel such that the pair of pivotal blocks pivot toward each other about one end of each thereof so as to be brought into close contact with two opposite sides of the in-situ coin cell and to hold the in-situ coin cell, each of the pair of pivotal blocks having a seating recess formed to be stepped so as to support the in-situ coin cell seated therein and being coupled with a respective one of the positive electrode tab and the negative electrode tab; and a spring member inserted into at least one insertion hole formed in the one end of each of the pair of pivotal blocks that faces a remaining one of the pair of pivotal blocks so as to apply pushing force so that the pair of pivotal blocks pivot toward each other.

11. The in-situ coin cell support device according to claim 10, wherein the seating part further comprises a pair of finger members for holding the in-situ coin cell, each of the pair of finger members being provided at one side of a respective one of the pair of pivotal blocks that faces a remaining one of the pair of pivotal blocks.

12. The in-situ coin cell support device according to claim 10, wherein the seating part further comprises:

a base plate secured to the first panel to support the pair of pivotal blocks disposed thereon; and an insulation member disposed between the first panel and the base plate.

* * * * *